United States Patent
Aigner et al.

(10) Patent No.: US 12,189,651 B2
(45) Date of Patent: Jan. 7, 2025

(54) COMPUTER-IMPLEMENTED METHOD FOR STORING DATA USING A DISTRIBUTED TRANSACTION DATABASE, COMPUTER PROGRAM PRODUCT, AND NETWORK

(71) Applicant: SIEMENS AKTIENGESELLSCHAFT, Munich (DE)

(72) Inventors: Tobias Aigner, Munich (DE); Markus Sauer, Munich (DE); Saurabh Narayan Singh, Bayern (DE); Nejc Zupan, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 17/927,981

(22) PCT Filed: May 26, 2021

(86) PCT No.: PCT/EP2021/064031
§ 371 (c)(1),
(2) Date: Nov. 28, 2022

(87) PCT Pub. No.: WO2021/239801
PCT Pub. Date: Dec. 2, 2021

(65) Prior Publication Data
US 2023/0214404 A1 Jul. 6, 2023

(30) Foreign Application Priority Data
May 29, 2020 (EP) .................................. 20177465

(51) Int. Cl.
*G06F 7/00* (2006.01)
*G06F 16/25* (2019.01)
*G06F 16/27* (2019.01)

(52) U.S. Cl.
CPC .............. *G06F 16/27* (2019.01); *G06F 16/25* (2019.01)

(58) Field of Classification Search
CPC .......... G06F 16/27; G06F 16/25; G06F 21/64; G06F 16/9024; H04L 9/3239; H04L 9/50; H04L 63/00
See application file for complete search history.

(56) References Cited

U.S. PATENT DOCUMENTS 11,418,402 B1 * 8/2022 Jakobsson ............. H04L 41/044
11,657,088 B1 * 5/2023 Acheson ........... G06F 16/90335
707/741

(Continued)

FOREIGN PATENT DOCUMENTS

WO 2020041127 A1 2/2020

OTHER PUBLICATIONS

Kan, Jia, Shangzhe Chen, and Xin Huang. "Improve blockchain performance using graph data structure and parallel mining." 2018 1st IEEE International Conference on Hot Information—Centric Networking (HotICN). IEEE, 2018. pp. 173-178.

(Continued)

*Primary Examiner* — Mohammed R Uddin
(74) *Attorney, Agent, or Firm* — Lempia Summerfield Katz LLC

(57) ABSTRACT

In a computer-implemented method for storing data in a network of linked computing units (10, 20, 30, 40, 50, 60) using a distributed transaction database (GDB), a distributed transaction database (GDB) in the form of a distributed graph database formed using nodes is used, and data is stored in at least one node (N) of the graph database, wherein the node (N) is stored using a real sub-quantity of the computing units (10, 20, 30, 40, 50, 60) of the network. The computer program product can be loaded directly into a (Continued)

storage device of an electronic computing unit (10, 20, 30, 40, 50, 60) and has program means in order to early out the steps of the method when the program is ran in a computing unit. The network of linked computing units (10, 20, 30, 40, 50, 60) stores a distributed transaction database (GDB) in the form of a distributed graph database comprising nodes (N) in which data is stored according to such a method.

13 Claims, 2 Drawing Sheets

(56) References Cited

U.S. PATENT DOCUMENTS

| | | | | |
|---|---|---|---|---|
| 2012/0209886 | A1* | 8/2012 | Henderson | G06F 16/9024 |
| | | | | 707/E17.011 |
| 2018/0196694 | A1* | 7/2018 | Banerjee | G06F 9/466 |
| 2018/0203908 | A1* | 7/2018 | Katayama | G06F 16/2246 |
| 2018/0205552 | A1* | 7/2018 | Struttmann | G06F 21/602 |
| 2020/0162264 | A1* | 5/2020 | Zamani | H04L 41/0893 |
| 2020/0351116 | A1* | 11/2020 | Jetzfellner | G06F 16/1734 |
| 2023/0342437 | A1* | 10/2023 | Pagani | G06F 21/57 |
| 2023/0351040 | A1* | 11/2023 | Cullari | G06F 21/57 |
| 2023/0351524 | A1* | 11/2023 | Hosoai | G06F 16/9024 |

OTHER PUBLICATIONS

PCT International Search Report and Written Opinion of International Searching Authority mailed Mar. 29, 2022 corresponding to PCT International Application No. PCT/EP2021/064031.

* cited by examiner

COMPUTER-IMPLEMENTED METHOD FOR STORING DATA USING A DISTRIBUTED TRANSACTION DATABASE, COMPUTER PROGRAM PRODUCT, AND NETWORK

CROSS REFERENCE TO RELATED APPLICATIONS

This present patent document is a § 371 nationalization of PCT Application Serial Number PCT/EP2021/064031, filed May 26, 2021, designating the United States, which is hereby incorporated in its entirety by reference. This patent document also claims the benefit of EP20177465.0, filed on May 29, 2020, which is also hereby incorporated in its entirety by reference.

FIELD

Embodiments relate to a computer-implemented method for storing data in a network of linked computing units using a distributed transaction database.

BACKGROUND

It is known to store data in distributed transaction databases. For example, such transaction databases are used in IoT environments, for example in production lines or power plants, in which field devices exchange data with one another using distributed transaction databases. Such transaction databases are normally implemented with networks of linked computing units, such as field devices, and stored in the network. In addition, for example, distributed transaction databases may be used to negotiate and store supply chain delivery data.

In distributed transaction databases, copies of the data stored in them are kept in each individual computing unit of the network. As a result, distributed transaction databases are not easily scalable, as the storage requirements increase considerably with the size of the distributed transactional database and the number of computing units on the network.

The significant growth in storage requirements is addressed by a measure known as "sharding" that splits the data of the distributed transaction database into parts and stores the parts using different computing units of the network. This splitting of the data in the transaction database is typically performed in a centralized manner. However, such centralized data splitting increases the susceptibility of such a network to errors, so that more decentralized approaches are generally preferred.

Distributed transaction databases, however, keep a copy of all data of the transaction database on every single computing unit of the network. Because distributed transaction databases, for example in combination with cryptographic procedures, are considered to be particularly tamper-proof and fail-safe, there is a tension between the scalability of a distributed transaction database on the one hand and the tamper-proofing and fail-safety of such a transaction database on the other.

Another problem with distributed transaction databases is that confidentiality of data stored in the transaction database may rarely be guaranteed. Up to now, such sensitive data has had to be stored outside the transaction database. This contradicts the basic concept of a distributed transaction database.

Further disadvantages relate to the increased communication effort in known distributed transaction databases once a certain size of the transaction database and/or the network is reached. The administration and coordination of storage and access to data stored in the transaction database may very easily become very large.

BRIEF SUMMARY AND DESCRIPTION

The scope of the embodiments is defined solely by the appended claims and is not affected to any degree by the statements within this summary. The present embodiments may obviate one or more of the drawbacks or limitations in the related art.

Embodiments provide a method for storing data in a network of linked computing units using a distributed transaction database. The method may be simpler to carry out than previously known methods for storing data using distributed transaction databases in the event of an increased transaction database size and/or an increased number of computing units. The method may also allow confidential storage of data.

Furthermore, embodiments provide a computer program that may be used to carry out such the method and a network of linked computing units by which such a method may be carried out.

The method is a computer-implemented method for storing data in a network of linked computing units using a distributed transaction database. The method uses a distributed transaction database in the form of a distributed graph database formed with nodes, and the data is stored in at least one node of the graph database. In the method, the node is stored by a true subset of the computing units of the network.

A true subset of the computing units of the network is defined as a set that does not include all computing units of the network, i.e., in the true subset at least one computing unit of the network of linked computing units is not included.

Storage by a computing unit storage in a memory of the computing unit and/or in a memory allocated to the computing unit. The computing unit executes memory instructions for storing data in this memory. The memory is conveniently a random-access memory and/or a data carrier, for example a hard disk and/or a cloud storage area allocated to the computing unit and/or linked and/or connected to the computing unit.

Not all the data of the distributed transaction database need to be stored using all the computing units of the network. Instead, individual nodes of the graph database may be stored using the computing units that make up a true subset of the computing units of the network. In this way, confidentiality requirements may be met very easily, by storing nodes of the graph database only on those computing units that are to be granted access to the data of the node.

In contrast, in the technique known as "sharding", the data of the transaction database is randomly split, i.e., a node-by-node division of data of the transaction database is not possible using known methods. The data stored in the nodes of the distributed graph database may be assigned to one or more specific application cases. In this way, the method may be used to divide data over specific selected computing units of the network application-by-application. For example, confidentiality levels may be assigned globally to specific application cases, so that certain authorizations of computing units for accessing this data may also be configured node-by-node and consequently also application-by-application.

Another advantage of the method is that the method may be easily scaled. Since the method only requires data to be stored using computing units of a true subset, in principle arbitrarily large transaction databases with arbitrary numbers of computing units may be implemented. The actual memory requirement in the method depends less on the number of computing units of the entire network than on the number of computing units of the respective subset, that does not, or not necessarily, grow with the size of the network.

Nor does the communication effort required for administration necessarily increase with the size of the transaction database and the number of computing units, since the communication effort, for example to synchronize the data of the node, is limited to the computing units of the true subset. Consequently, the method allows data to be stored efficiently in arbitrarily large transaction databases with any number of nodes and in arbitrarily large networks with any number of computing units.

A distributed transaction database refers to a database that is also referred to in common usage as a "Distributed Ledger". It is also understood that a graph database means a graph database formed with nodes and edges, in which data is entered in nodes that are connected to each other via edges.

The edges form cryptographic connections between the nodes, for example by hash values and/or by one-way functions and/or by cryptographic keys.

The computing units are conveniently computers and/or servers. In principle, a computing unit may also be formed as a logical computing unit, that in turn is implemented via a distributed computing network, for example via a cloud network.

In an embodiment of the method, the data is or includes transaction data of transactions of computing units of the network, i.e., of transactions in which computing units of the network participate, and the true subset of computing units includes at least or precisely those computing units that participate in the transactions of the transaction data.

In this way, the data stored in the nodes is stored using those computing units of the network that participate in the transactions of the transaction data stored in the node. Only those computing units that participate in the transactions of the transaction data may be used.

In this way, the contents of the nodes may advantageously only be made accessible to those computing units that are already involved in the transactions of the transaction data stored in the nodes. The transaction data stored in the nodes is only accessible to those computing units that have any relation to the transaction data. In this way, data in the form of transaction data may be reliably kept confidential and only shared with those computing units that require knowledge of the transaction data in order to complete the transactions.

By this embodiment of the method, a transaction database may be advantageously implemented in which transaction data in a true subset of the computing units may be treated confidentially. Consequently, there is no need to compromise in choosing between public accessibility of the transaction database and compliance with a confidentiality requirement, instead this embodiment of the method allows both objectives to be achieved in equal measure.

In an embodiment, in the method the node is part of a path of a graph of the graph database formed with nodes. A path is a continuously linked chain of nodes that are connected to each other, conveniently by edges. Such a path may form a branch or a loop of the graph. For a branch of the graph, all nodes of that branch of the graph may be stored by the true subset of the computing units. Appropriately, the data stored in the nodes of the branch is transaction data, and the true subset includes the unifying set of the computing units involved in the transactions of the transaction data of the nodes of the branch.

In this way, not only may the transaction data of individual nodes may be distributed confidentially over the true subset of the computing units, but data may even be stored in an entire path, that, as a result of the storage using the true subset of the computing units of the network, remains confidential among these computing units of the subset.

Thus, branches, so-called side-chains, may be stored confidentially by a true subset of the computing units, so that the entire network will not necessarily gain knowledge about the data stored in the branch. The path forms a loop of the graph, i.e., the path not only branches off from other parts of the graph, but reunites with the graph so that, to a certain extent, a loop is joined to other parts of the graph. The path forms the loop together with other parts of the graph that do not belong to the path, i.e., the path branches off from other parts of the graph and reunites with these other parts. Thus, the path does not include these other parts of the graph, but only the branched-off and not yet reunified part of the path.

Thus, data from the path may be handled confidentially in the true subset of the true units, but results based on this confidentially handled data may be re-entered into the rest of the graph required for transaction data in other parts of the network, for example, in computing units outside the true subset. Thus, in the method the transaction database is not decomposed into individual sub-transaction databases, but instead the transaction database remains a coherent database in which interactions and/or data exchanges between individual subsets of the computing units of the network remain possible.

In the method, the data stored in the nodes of the path may be transaction data of transactions of computing units of the network, that may be assigned, for example exclusively, to an application case. Thus, in this embodiment, application cases may be stored by a separate path of the graph of the graph database.

In an embodiment of the method, data is stored in nodes of such a graph database, that includes several paths. In each case the path, i.e., the nodes belonging to a particular path, is stored by a true subset of computing units of the network and the true subsets have an intersection that is different from the true subsets. In this way, the method stores data in a graph database that is stored in subsets of the computing units of the network that are not identical to each other, i.e., there are at least computing units of one subset that is not part of another subset. This allows data with different authorization groups to be stored in the transaction database.

In an embodiment, it is possible that the intersection is empty, i.e., no computing unit is part of all the subsets.

However, in a further embodiment, it may also be the case that the intersection is not empty, i.e., there is an overlap of the subsets. The overlap includes at least one computing unit of the network. For example, one or more such computing units that perform administration tasks in the network may form this non-empty intersection.

The computer program may be loaded directly into a memory of an electronic computing unit. The computer program carries out the steps of the previously described method when the program is executed in one of the computing units.

The network of linked computing units stores a distributed transaction database in the form of a distributed graph database. The graph database includes nodes in which data is stored according to a method—as explained above.

DETAILED DESCRIPTION

Figure 1:
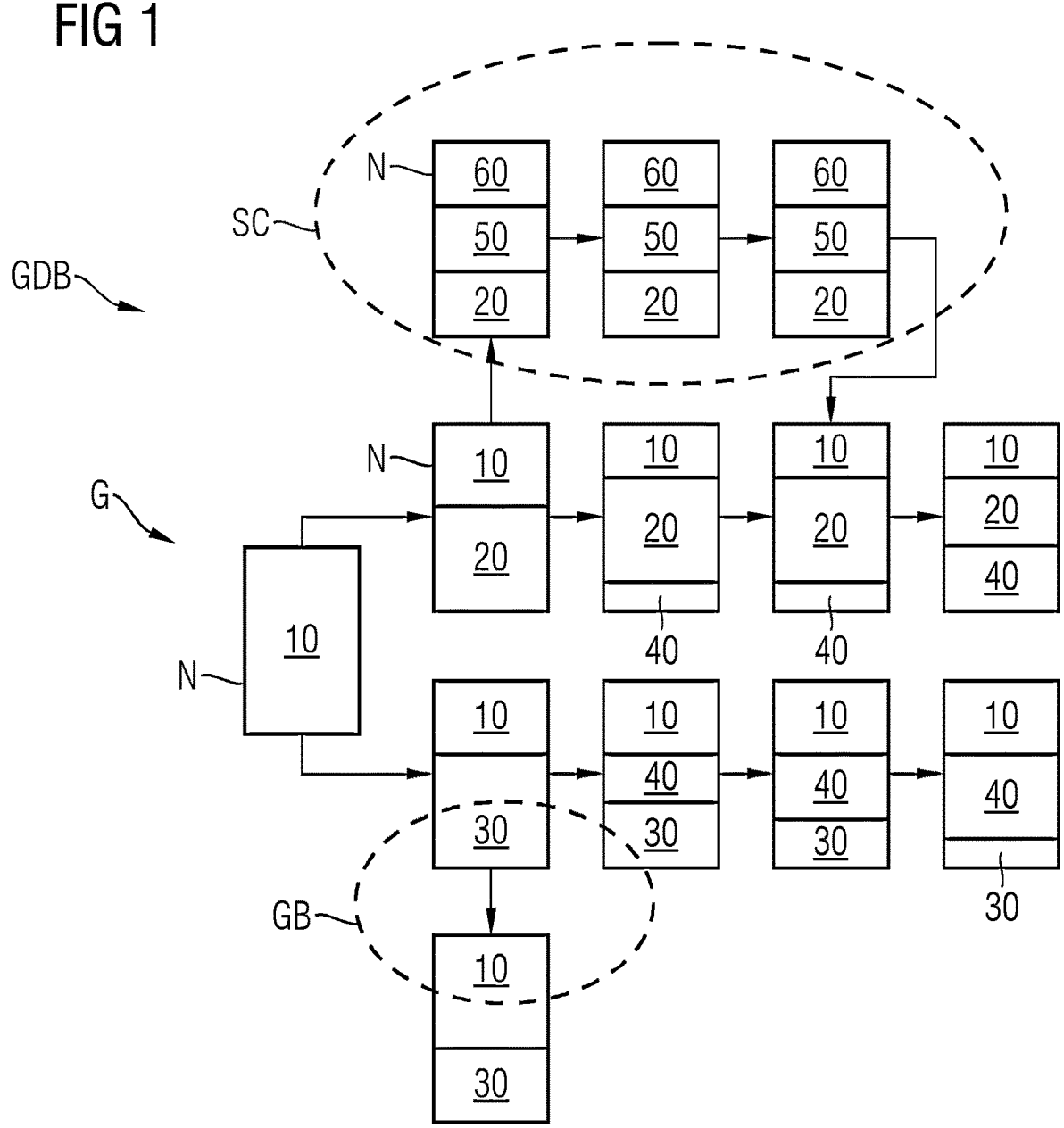
FIG. 1 depicts a schematic view of a distributed transaction database in the form of a distributed graph database in a principle diagram according to an embodiment.

The distributed transaction database depicted in FIG. 1 is a distributed graph database GDB. The graph database GDB forms a distributed ledger. In the graph database GDB, data is entered in nodes N, that are connected to each other via edges. The edges represent cryptographic connections between the nodes N, that in the embodiment shown are hash values. In other embodiments that are not shown separately, other types of one-way functions or cryptographic keys may be used to link the nodes N.

The graph database GDB is formed with a graph G, that includes individual nodes N. The nodes N of the graph G are linked to each other by cryptographic methods that represent a consensus mechanism, in the embodiment shown, a "Proof of Work" or a "Proof of Stake". Other consensus mechanisms may also be used in other embodiments that are not shown separately. The link is shown in FIG. 1 by arrows connecting the nodes N. The graph database GDB is designed to store data from supply chains. The graph G of the graph database GDB maps the internal structure of the supply chain, that has application-specific branches. Depending on the application case, for the different branches there are different units affected by the application, that is reflected in different computing units 10, 20, 30, 40, 50, 60 of the network that stores and thus operates the graph database GDB.

The computing units 10, 20 30, 40, 50, 60 in the context are computers operating as servers. In principle, in other embodiments, not shown separately, a computing unit 10, 20, 30, 40, 50, 60 may also be formed as a logical computing unit, that in turn is implemented via a distributed computer network, for example via a cloud network.

Storage by a computing unit 10, 20, 30, 40, 50, 60 means storage in a memory of the computing unit 10, 20, 30, 40, 50, 60, in this case a random-access memory. In other embodiments, not shown specifically, this may also refer to storage in a memory allocated to one of the computing units 10, 20 30, 40, 50, 60. In other embodiments, not shown specifically, that correspond to the embodiment shown, the memory may also be a data carrier, such as a hard disk or a cloud storage system assigned to the computing unit and linked to the computing unit 10, 20, 30, 40, 50, 60 for signal communication.

A root of the graph database GDB is shown in FIG. 1 as a node N located on the far left. This root contains only initialization data and configuration data of the network as well as administration data for further administration of the network 10, 20, 30, 40, 50, 60. Consequently, data stored in this node N is stored over a small subset of computing units 10 of the network 10, 20, 30, 40, 50, 60. The data of the node N is stored redundantly by the computing units 10 of the subset. The graph G branches progressively from this node N into two branches, that represent different use-case applications.

A first application case involves the subset of the computing units 10 and a further subset of the computing units 20, that in the embodiment shown in FIG. 1 forms the application case branching off at the top. A second application case involves the computing units 10, 30. Consequently, in the first application case, the nodes N are stored redundantly using the computing units 10, 20, in the second application case using the computing units 10, 30.

In both application cases, later in the procedure the computing units of a subset 40 are also involved, that, as shown in FIG. 1 moving rightwards, store transaction data in the nodes N and maintain copies of the nodes N.

In FIG. 1 right at the top, a private side-chain SC branches off from the graph G. The nodes N of the private side-chain SC only contain data of the computing units 20, 50, 60, whereas the data stored there no longer affects the computing units 10. As a result, data of the computing units 10 is not stored in the node N of the private side-chain. Instead, the nodes N of the private side-chain SC are only stored using the computing units 20, 50, 60.

After the application case for the private side-chain SC has been completed, the private side-chain SC is reunited with the rest of graph G.

Shown at the bottom is an example of a branch in which a branch GB branches downwards.

Although the branch GB also relates to transactions of the computing units 10, 30, so that the subset of the computing units 10, 30 that the branch GB relates to does not differ from the subset of the computing units 10, 30, from which the branch GB branches off. However, the branch GB forms a new application case, that by the branch GB is thus also represented in the structure of the graph G as a separate branch GB.

In the embodiment shown, the computing units 10 form consortium computing units 10, that store all nodes N of the graph G with the exception of the nodes N of the private side-chain SC.

Figure 2:
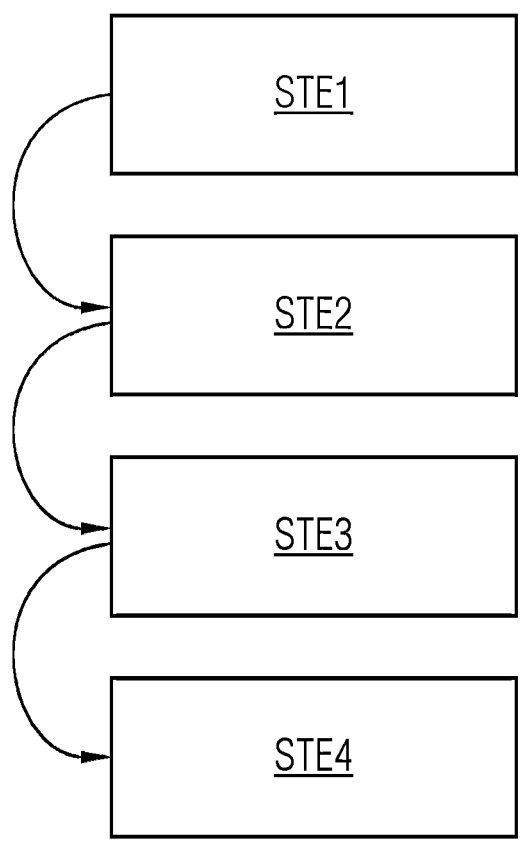
FIG. 2 depicts steps of the method schematically in a principle diagram according to an embodiment.

By the method, data is stored in the nodes N of the graph G of the distributed graph database GDB. The method for storing the data in the nodes N is based on the branch GB of FIG. 1 as shown in FIG. 2: when a new node N of the graph G is available, the computing units 10, 30 that interact in a particular application case are first identified. This subset of the computing units 10, 30 therefore also place data in node N of the application case. The identification of this subset of the computing units 10, 30 takes place in step STE1.

The computing units 10, 30 of the subset in turn make their computing units 10, 30 available in order to store the node N of the graph G. A list of these computing units 10, 30, for example in the form of MAC addresses or IP addresses, is transmitted to all computing units 10, 30 of the subset. Each computing unit 10, 30 thus accepts a list of the computing units 10, 30 available for this application case in a step STE2.

Then, the computing units 10, 30 create a branch GB of node N, that is specific to this application case. Each computing device 10, 30 that places data into these nodes N transmits the data that it places to all computing devices 10, 30 of the subset, in a step STE3.

At the same time, a set of copies of data from all other computing devices 10, 30 is obtained from each computing device 10, 30 in a step STE4.

In addition, copies of the data stored in the nodes N of the branch GB are stored in the consortium computing devices 10—with the exception of the data of nodes N in private side-chains SC.

It is to be understood that the elements and features recited in the appended claims may be combined in different ways to produce new claims that likewise fall within the scope of the present embodiments. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present embodiments have been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method for storing data in a network of linked computing devices using a distributed transaction database, the method comprising:
    generating the distributed transaction database in a form of a distributed graph database using a plurality of nodes, wherein the plurality of nodes are linked to each other by cryptographic methods that represent a consensus mechanism; and
    storing the data in at least one node of the distributed graph database, wherein the at least one node is part of a path of the distributed graph database comprising two or more nodes of the plurality of nodes, wherein the path forms a branch of the distributed graph databases, wherein all nodes of the branch are stored using a true subset of the linked computing devices of the network, wherein the data stored in the two or more nodes of the branch is transaction data, and the true subset includes a unifying set of the computing devices involved in transactions of the transaction data of the two or more nodes of the branch.

2. The method of claim 1, wherein the path forms a loop of the graph.

3. The method of claim 1, wherein the data stored in nodes of the path is transaction data of transactions of computing devices of the network, that are assigned to an application.

4. The method of claim 1, wherein the data is stored in at least one node of the distributed graph database that includes multiple paths, the nodes of which are each stored by respective true subsets of linked computing devices of the network, wherein the respective true subsets include an intersection that is different from the true subsets.

5. The method of claim 4, wherein the intersection is empty.

6. The method of claim 4, wherein the intersection is not empty.

7. A computer program product loaded directly into a non-transitory computer implemented storage medium of an electronic computing device, containing machine-readable instructions executable by the electronic computing unit, the machine-readable instructions comprising:
    generating a distributed transaction database in a form of a distributed graph database using a plurality of nodes, wherein the plurality of nodes are linked to each other by cryptographic methods that represent a consensus mechanism; and
    storing data in at least one node of the distributed graph database, wherein the at least one node is part of a path of the distributed graph database comprising two or more nodes of the plurality of nodes, wherein the path forms a branch of the distributed graph databases, wherein all nodes of the branch are stored using a true subset of a plurality of electronic computing devices comprising at least the electronic computing device, wherein the data stored in the two or more nodes of the branch is transaction data, and the true subset includes a unifying set of the computing devices involved in transactions of the transaction data of the two or more nodes of the branch.

8. A system comprising:
    a network of linked computing devices configured to store a distributed transaction database (GDB) in a form of a distributed graph database, comprising nodes in which data is stored in at least one node of the distributed graph database, wherein the plurality of nodes are linked to each other by cryptographic methods that represent a consensus mechanism, wherein the at least one node is part of a path of the distributed graph database comprising two or more nodes of the plurality of nodes, wherein the path forms a branch of the distributed graph databases, wherein all nodes of the branch are stored using a true subset of a plurality of electronic computing devices comprising at least the electronic computing unit, wherein the data stored in the two or more nodes of the branch is transaction data, and the true subset includes a unifying set of the computing devices involved in transactions of the transaction data of the two or more nodes of the branch.

9. The system of claim 8, wherein the path forms a loop of the graph.

10. The system of claim 8, wherein the data stored in nodes of the path is transaction data of transactions of the linked computing devices of the network, that are assigned to an application.

11. The system of claim 8, wherein the data is stored in at least one node of the distributed graph database that includes multiple paths, the nodes of which are each stored by respective true subsets of the linked computing devices of the network, wherein the true subsets include have an intersection that is different from the respective true subsets.

12. The system of claim 11, wherein the intersection is empty.

13. The system of claim 11, wherein the intersection is not empty.

* * * * *